United States Patent
Song et al.

(10) Patent No.: US 6,436,565 B1
(45) Date of Patent: Aug. 20, 2002

(54) FUEL ELECTRODE-SUPPORTED TUBULAR SOLID OXIDE FUEL CELL AND METHOD OF MANUFACTURING THE SAME

(75) Inventors: Rak-Hyun Song; Dong-Ryul Shin; Eung-Yong Kim, all of Taejon (KR); Harumi Yokokawa, Ibaraki (JP)

(73) Assignee: Korea Institute of Energy Research, Seoul (KR)

( * ) Notice: Subject to any disclaimer, the term of this patent is extended or adjusted under 35 U.S.C. 154(b) by 82 days.

(21) Appl. No.: 09/611,990

(22) Filed: Jul. 7, 2000

(30) Foreign Application Priority Data

Oct. 1, 1999 (KR) .............................. 99-42365

(51) Int. Cl.$^7$ ................................. H01M 8/12
(52) U.S. Cl. ........................................ 429/31
(58) Field of Search ..................... 429/30, 31

(56) References Cited

U.S. PATENT DOCUMENTS

| | | | | |
|---|---|---|---|---|
| 5,217,822 A | * | 6/1993 | Yoshida et al. | 429/33 |
| 5,786,105 A | * | 7/1998 | Matsushima et al. | 429/34 |
| 6,207,311 B1 | * | 3/2001 | Baozhen et al. | 429/31 |
| 6,228,521 B1 | * | 5/2001 | Kim et al. | 429/33 |

OTHER PUBLICATIONS

Buchkremer, H.P. et al. Advances in Manufacturing and Operation of Anode Supported SOFC Cells and Stacks. Third European Solid Oxide Fuel Cell Forum Proceedings, (Jun. 2–5, 1998) pp. 143–149.

Singhal, S.C. Recent Progress in Tubular Solid Oxide Fuel Cell Technology. Proceedings on the Fifth International Symposium on Solid Oxide Fuel Cells (SOFC–V), Electrochemical Proceedings Vol. 97–18, pp. 37–50.

* cited by examiner

Primary Examiner—Brian Harrison
Assistant Examiner—M. Wills
(74) Attorney, Agent, or Firm—DeLio & Peterson, LLC

(57) ABSTRACT

A method of making and fuel electrode-supported solid oxide fuel cell (SOFC). For manufacturing the SOFC, YSZ powder containing 30 to 50 vol % of Ni is mixed with carbon powder to give a fuel electrolyte slurry which is pre-sintered, coated on a fuel electrode tube, and then the coated tube is sintered. An air electrode slurry made of $(La, Sr)MnO_3$ powder is coated on the electrolyte-coated tube and sintered. The fuel electrode of the metal (Ni/ceramic (YSZ) cermet of the SOFC is a support and the electrolyte layer underlaying the air electrode is coated as a thin film. At about 1,000° C., the Ni components of the fuel electrode are connected to each other like a mesh, improving the fuel electrode strength while the porous fuel electrode allows the sufficient permeation of fuel gas, thereby providing a large economical profit in the production cost without degradation of fuel cell performance.

5 Claims, 3 Drawing Sheets

FUEL ELECTRODE-SUPPORTED TUBULAR SOLID OXIDE FUEL CELL AND METHOD OF MANUFACTURING THE SAME

BACKGROUND OF THE INVENTION

1. Field of the Invention

The present invention relates to a tubular solid oxide fuel cell and more particularly, a fuel electrode-supported tubular solid oxide fuel cell whose support strength is without degradation of cell performance. Also, the present invention is concerned with a less costly method of fabricating a fuel electrode-supported tubular solid oxide fuel cell, which is presently the key technical challenge facing SOFC.

2. Description of the Prior Art

Up to date, great advance has been brought about in the development of fuel cells. Phosphoric acid fuel cell (PAFC) and molten carbonate fuel cell (MCFC) are now being developed for the application for power generating systems of 100 kW or greater. Although it was studied later than PAFC and MCFC, solid oxide fuel cell (SOFC), so-called, the third generation fuel cell, is expected to be in practical use in the near future, subsequent to PAFC and MCFC, by virtue of the recent rapid development of material technology. To this end, advanced nations have devoted tremendous effort to the fundamental research on SOFC and enlarged production scale.

Since the operating temperature of SOFC is in the range from 700 to 1,000° C., its energy conversion efficiency is fairly higher than any other conventional fuel cell and has advantages of very low environmental pollution, requiring no fuel modifiers, and being capable of complex power generation.

Depending on their shapes, SOFC are clarified as tubular and planar. For tubular SOFC, air electrode-supported type fuel cells are developed in U.S.A. and Japan (see, S. C. Singhal, "Recent progress in tubular solid oxide fuel cell technology" in Solid Oxide Fuel Cells V. PV 97-40 p. 37 (1997)). In the case of the planar SOFC, two types of configurations were followed: self-supported type in which electrolytes are used as supports and fuel electrode-supported type. (see, H. P. Buchkremer, U. Diekmann, L. G. J. de Haart, H. Kabs, D. Stover and I. C. Vinke, "Advances in Manufacturing and Operation of Anode Supported SOFC Cells and Stacks" in Third European Fuel Cell Forum p. 143 (1998)).

Based on the advantage of conducting easy sealing and of being of high thermal resistance, the tubular SOFC are now under extensive study in many companies and research institutes, including Westinghouse. However, tubular fuel cells suffer from a disadvantage of being high in production cost because air electrode materials, such as La, Mn, etc., are very expensive.

In addition, another disadvantage of tubular fuel cells is that air electrodes have poor strength because the air electrodes are ceramics themselves compared to the fuel electrodes made of cermets composed of metal and ceramic. In addition, conventional air electrode-supported tubular SOFC are economically unfavorable because an Electrochemical Vapor Deposition (EVD) process, which accompanies high costs, usually conducts the coating of electrolyte on the air electrode support.

On the other hand, extensive attention is paid to electrode-supported type as they are found to be prepared at low cost with maintaining high mechanical strength.

SUMMARY OF THE INVENTION

Therefore, it is an object of the present invention to overcome the above problems and to provide a fuel electrode-supported tubular SOFC which is greatly improved in support strength without degradation of cell performance.

It is another object of the present invention to provide a method for manufacturing a fuel electrode-supported tubular SOFC with less production cost.

The fuel electrode-supported tubular SOFC has a structure in which the fuel electrode made of the metal (Ni)/ceramic (YSZ) cermets also play a role as a support. The electrolyte layer underlaying the air electrode is coated as a thin film on the support by a slurry coating process, which is a low-cost process.

In one embodiment of the present invention, there is provided a fuel electrode-supported tubular solid oxide fuel cell, comprising: a porous, tubular fuel electrode made of YSZ with a Ni content of 30–50 vol %, playing a role as a support; an electrolyte layer coated on the fuel electrode; and an air electrode made of (La, Sr)MnO, overlaying the electrolyte layer.

In another embodiment of the present invention, there is provided a method for manufacturing a fuel electrode-supported tubular solid oxide fuel cell, comprising the steps of mixing $Y_2O_3$-stabilized $ZrO_2$ powder containing 30–50 vol % of Ni with a carbon powder as a pore forming agent. The slurry is molded into fuel electrode tube by extrusion and pre-sintered. The electrolyte slurry made of $Y_2O_3$-stabilized $ZrO_2$ is coated on the pre-sintered fuel electrode tube by slurry coating process and sintered. Finally air electrode slurry made of $(La, Sr)MnO_3$ powder is coated on the electrolyte layer in a slurry coating process. The fabrication process is completed in sintering the coated air electrode.

BRIEF DESCRIPTION OF THE DRAWINGS

The above and other objects, features and advantages of the present invention will be more clearly understood from the following detailed description taken in conjunction with the accompanying drawings, in which:

FIG. 4(a) shows micro structure after the pre-sintering, FIG. 4(b) shows micro structure after the sintering, FIG. 4(c) shows micro structure of an electrolyte layer-coated fuel electrode support tube, and FIG. 4(d) shows an appearance of the fuel electrode support tube molded by extrusion.

DETAILED DESCRIPTION OF THE INVENTION

Figure 1:
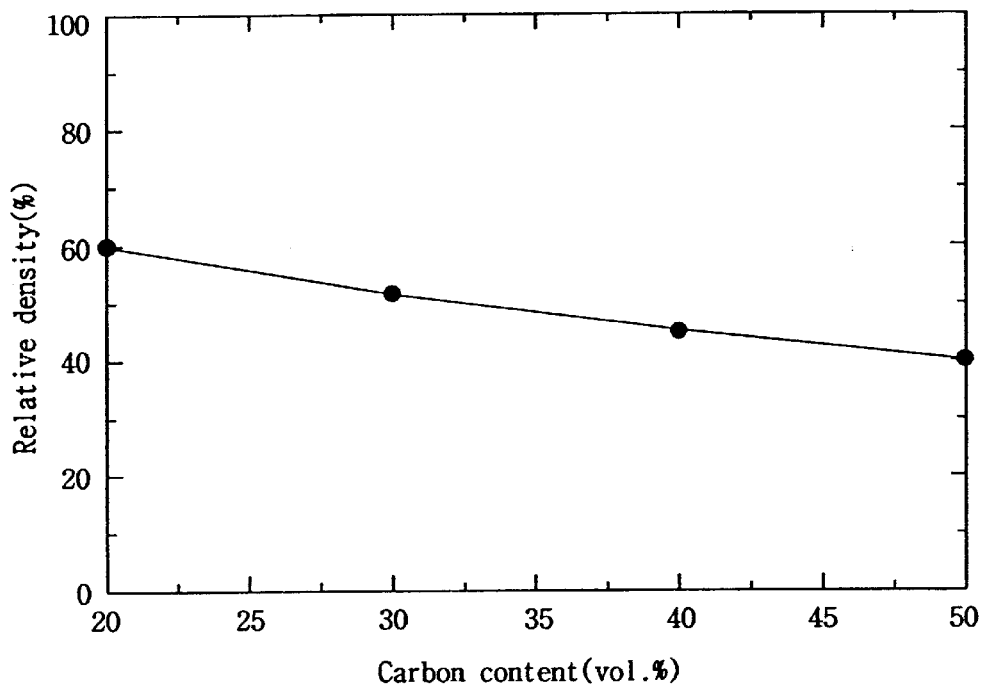
FIG. 1 is a graph showing the change in relative density of the sintered fuel electrode according to its carbon content

The present invention pertains to a tubular SOFC which comprises a fuel electrode serving as a support, an electrolyte coated on the fuel electrode, and an air electrode.

Being of a porous tube configuration, the fuel electrode is made of yttria-stabilized zirconia ($Y_2O_3$-Stabilized $ZrO_2$, hereinafter referred to as "YSZ") containing 30–50 vol % of Ni.

To maintain the required porous structure, carbon powder is added as a pore former. During the sintering process, carbon powder is combusted resulting in microstructure with improved porosity.

Because of providing a site at which an eletrochemical reaction of a fuel occurs, a fuel electrode should exhibit morphological stability at reducing atmospheres and be of sufficient catalytic activity to fuel gas in addition to showing sufficient electronic conductivity.

The fuel electrode is formed by extrusion method. In this regard, YSZ powder is slurried along with Ni powder and carbon powder. The Ni powder is preferably used at an amount of 30 to 50 vol % based on the volume of the YSZ powder. Generally, the electronic conductivity of an Ni/YSZ cermet is dependent on Ni content. When the Ni content in the Ni/YSZ cermet is more than 30 vol %, a good interfacial bonding is brought about among the nickel particles, resulting in an increase in electronic conductivity. When the Ni content is less than 30 vol %, the Ni/YSZ cermet has a poor electronic conductivity.

On the other hand, when the Ni content is over 50 vol %, the Ni/YSZ cermet has a large thermal expansion coefficient, which is greatly different from those of the other materials. Thus the thermal mismatch between the anode and other component results in racks during its preparation or cell testing. The Ni content ranging from 30 to 50 vol % is able to maintain the electronic conductivity of the YSZ powder in the level necessary for a fuel electrode with a minimum of the difference in the thermal expansion coefficient between the constituent members of the fuel electrode.

The carbon powder, as mentioned above, functions as a pore-forming agent, which is to provide pores within the tubular support at a sintering step after the final molding, and is preferably added at an amount of 20 to 50 vol % based on the volume of the Ni/YSZ cermet powder. For example, if the carbon content is below 20 vol %, the tubular support is too low in porosity to operate normally as an electrode. On the other hand, if the carbon content exceeds 50 vol %, the tubular support becomes poor in strength owing to its too high porosity.

The fuel electrode slurry obtained from a mixture of the YSZ powder, the Ni powder and the carbon powder is molded into a tube by extrusion.

Subsequently, the extruded tube is subjected to a presintering process. Preferably, this pre-sintering process is conducted in the temperature range from 1,250 to 1,350° C. If the pre-sintering process is conducted at too low temperatures, the sintered body cannot acquire enough strength to endure subsequent electrolyte coating process. On the other hand, when the extruded tube is sintered at higher than 1,350° C., it experiences such seriousness that the sintered body, when being co-sintered together with an electrolyte slurry coated thereon, is apt to crack owing to the difference in shrinkage between item.

Separately, the electrolyte slurry is prepared from YSZ. Then, this electrolyte slurry is coated over all areas of the outer surface of the pre-sintered body in a slurry coating process, followed by co-sintering process. In this regard, it is preferable that the electrolyte-coated fuel electrode tube is sintered at 1,400–1,500° C. If the co-sintering temperature is less than 1,400° C., the electrolyte-coated fuel electrode tube, that is, the anode/electrolyte, cannot have proper sintered structure. On the other hand, the sintering process of more than 1,500° C. results in a poor microstructure of the co-sintered body.

As for the air electrode, it is prepared by coating (La, Sr)$MnO_3$ over the electrolyte in a slurry coating process and sintering the coating at 1,150–1,250° C. Sintering temperature less than 1,150° C. results in an insufficient sintered structure. On the other hand, at more than 1,250° C., excessive sintering results in losing the Mn element from the air electrode to deteriorate the microstructure of the coat.

A better understanding of the present invention may be obtained in light of the following examples which are set forth to illustrate.

EXAMPLE 1

Preparation of Fuel Electrode Powder

After being weighed in the composition ranges of the invention, respectively, NiO powder and 8 mol % $Y_2O_3$-stabilized $ZrO_2$ powder were mixed together. This mixture was ball-milled for 24 hours with using zirconia balls in a zirconia vessel, then, ethanol was added and finally milled for 24 hours to give slurry. The slurry was dried on a hot plate, pulverized, and dried at 550° C. for 3 hours to give a primary powder. After a heat treatment at 1,400° C. for 5 hours, the primary powder was accelerating ball-milled at 150 rpm to afford a fine powder.

EXAMPLE 2

Construction of Fuel Electrode Support

In order to determine an optimal content of carbon useful as a pore-forming agent in the molding of a fuel electrode support tube, NiO-8YSZ pellets with carbon contents ranging from 20 to 50 vol % were prepared by a mono-axial pressure molding process. To this end, the fuel electrode powder obtained in Example 1 and a carbon powder were weighed in the composition ranges of the invention, respectively, added with a binder (poly vinyl alcohol 2 wt %) and milled for 12 hours by use of accelerating ball mills. In a mold, the resulting mixture was pelletized under a pressure of 6,000 psi, after which heat treatment was conducted at 500° C. for 3 hours, 750° C. for 2 hours and 750° C. for 2 hours in series to remove the carbon powder. The de-carbonized pellets were sintered at 1,400° C. to give sintered bodies. These sintered bodies were measured for weight and volume to calculate their relative densities and the results are given in FIG. 1.

The relative densities, as shown in FIG. 1, were decreased linearly as the carbon content increased. Although the low relative density was not accurately revealed whether it is attributed to open pores or closed pores, the sintered bodies (fuel electrode supports) were believed to contain sufficient pores.

To the fuel electrode powder obtained in Example 1, a carbon powder was added at an amount of 20 to 50 vol %, along with a binder and distilled water, to give a fuel electrode paste. In this regard, the fuel electrode paste was ball-milled along with a mixture of a carbon powder and ethanol, for 14 days, followed by drying on a hot plate.

Through the intensive and thorough research on fuel electrode-supported tubular SOFC, repeated by the present inventors, it was found that the amount of the binder used is critical in determining the strength of the tube to be extruded. Based on the finding, a mix binder of various organic materials was added at an amount of 50 vol % to the ball-milled fuel electrode powder which was then kneaded in a kneader along with 30 wt % of distilled water. The mixture was allowed to stand at room temperature for 24 hours for an aging effect.

The paste thus obtained was extruded into the tube which was then dried at 200° C. for 24 hours and pre-sintered at 1,300° C.

EXAMPLE 3

Slurry Coating of Electrolyte

An electrolyte slurry was prepared by mixing 8 mol % YSZ with additives as follows.

30 g of 8 mol % YSZ was ball-milled using zirconia balls at 150 rpm for 24 hours in a zirconia vessel, together with 0.7 g of poly vinyl butyral (PVB) as a binder, 0.7 cc of dibutyl phthalate as a plasticizer, 2 cc of Triton-X (polyethylene glycol mono-p-isotylphenyl ether) as a homogenizer, 2 cc of fish oil as a dispersant, and 25 cc of toluene and 50 cc of 2-propanol as solvents.

The porous fuel electrode support tube which had been pre-sintered at 1,300° C. through the above construction of fuel electrode support, was immersed in the zirconia slurry to obtain the desired coating thickness.

The thickness of the electrolyte layer coated on the fuel electrode support depends on the viscosity of the electrolyte slurry and the numbers of dipping. That is, the more viscous the slurry is and the more frequent the dipping are, the thicker the coated layer is. However, cracks which transverse the thick electrolyte layer may occur owing to the difference in shrinkage factor between the fuel electrode support tube and the electrolyte layer. Therefore, it is advantageous that the porous fuel electrode support tube is coated many times with the appropriately diluted slurry until a desired thickness of the electrolyte layer is obtained.

In this example, the porous fuel electrode support tube was given three subsequent coatings to form an electrolyte layer of 60 μm while the slurry was coated at a thickness of 20 μm each coating round.

Next, the coated tube was dewaxed at 350° C., followed by sintering at 1,400° C. to produce a fuel electrode/electrolyte tube. This tube was 25 mm in diameter and 2 mm in thickness.

EXAMPLE 4

Preparation of Air Electrode Slurry and Construction of Single Cell

In order to fulfill its full role in affording a site at which an oxidant reacts, the air electrode is required to be stable to oxidant atmospheres and show sufficient electronic conductivity and catalytic activity to oxygen gas at an operation temperature of about 1,000° C.. To meet these requirements, $LaSrMnO_3$ (LSM) was employed as a material for the air electrode.

LSM was prepared from $Mn(NO_3)_2$, $SrCO_3+HNO_3$ and $La_2O_3$ solutions by co-precipitation. These solutions were mixed and poured in $H_2C_2O_4+EtOH$ solution to precipitate metal elements. The hydroxates precipitated were dried for 5 hours at 50° C., followed by calcination at 800–1,000° C.

40 g of the LSM air electrode powder obtained through the above procedure was ball-milled using zirconia balls at 150 rpm for 24 hours in a zirconia vessel, together with 0.7 g of polyvinyl butyral (PVB) as a binder, 0.7 cc of dibutyl phthalate as a plasticizer, 2 cc of Triton-X as a homogenizer, 2 cc of fish oil as a dispersant, and 25 cc of toluene and 50 cc of 2-propanol as solvents.

The LSM slurry was coated on the co-sintered fuel electrode/electrolyte tube to a desired thickness by a slurry coating method, after which the fuel electrode/electrolyte tube was dewaxed at 350° C. and sintered at 1,200° C. to construct a single cell of fuel electrode-supported SOFC.

Figure 2:
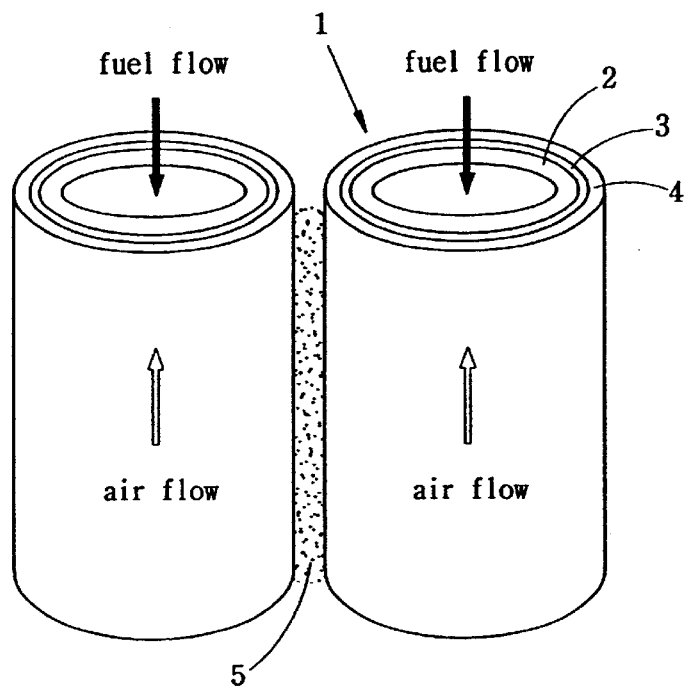
FIG. 2 is a schematic view showing the structure of a fuel electrode-supported tubular SOFC according to the present invention

With reference to FIG. 2, there is schematically shown a fuel electrode-supported SOFC consisting of single cells 1 in accordance with the present invention. At the innermost of each single cell 1, as seen, a tubular fuel electrode 2, which also functions as a support, is located and an electrolyte 3 and an air electrode 4 are, in order, stacked on the outer circumference surface of the tubular fuel electrode 2. The single cell 1 of such a structure is connected adjacent to another single cell via an LSM felt 5 made of the same materials as those of the air electrode 4, forming a fuel cell.

EXAMPLE 5

Property Evaluation

An examination was made of the porosity and microstructure of the fuel electrode support.

Figure 3:
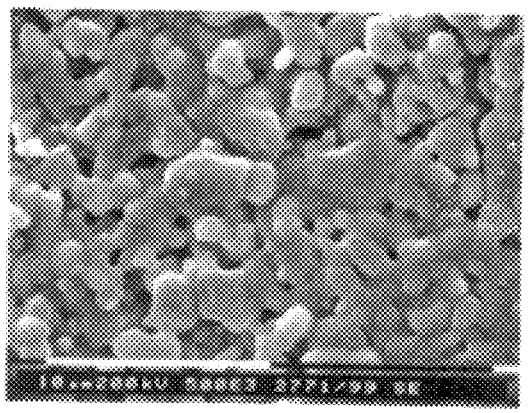
FIG. 3(a) and FIG. 3(b) show microstructures of the fuel electrodes with a carbon content of FIG. 3(a) 20 vol % and FIG. 3(b) 50 vol % in scanning electron photographs.
Figure 3:
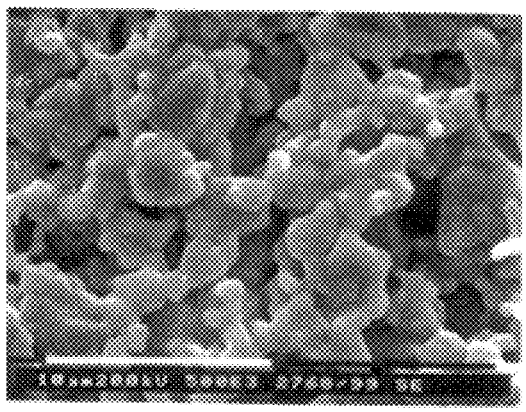

With reference to FIG. 3, there are shown microstructures of fuel electrode supports with carbon contents of (a) 20 vol % and (b) 50 col %. As shown, greater carbon contents resulted in higher porosity in the fuel electrode support and the carbon content had no influence on the particle size of the fuel electrode support.

By use of a mercury porosimeter, the fuel electrode supports were measured for porosity and the results are given in Table 1, below.

TABLE 1

| Processes | Carbon Content (Vol %) | Porosity (%) |
|---|---|---|
| Die Pressing | 20 | 25 |
|  | 30 | 29 |
|  | 40 | 31 |
| Extrusion | 30 | 35 (43*) |

*Pre-sintered tube

As indicated in Table 1, the porosity of the fuel electrode support molded by die pressing tends to increase with the increasing of the carbon content, but the difference in porosity between the fuel electrodes with carbon contents of 30 vol % and 40 vol % is not so large. The reason is that an excess of carbon is combusted incompletely during the heat treatment of the sintered fuel electrode support, so that its significant portion remains. Therefore, as low % of carbon content as possible is advantageous if falling within a similar porosity range.

In addition, it was found that extrusion can render the fuel electrode to be more porous than can die pressing. Consequently, the fuel electrode support is preferably prepared by use of 30 vol % of carbon in an extrusion process.

Figure 4:
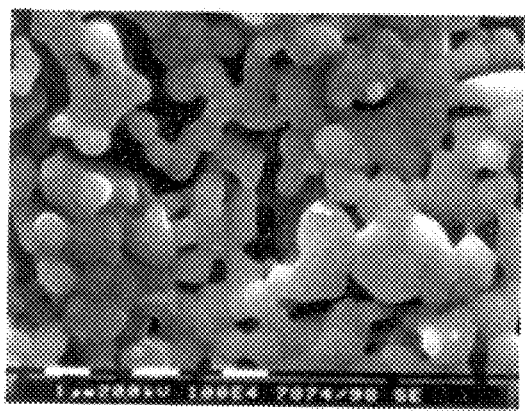
FIG. 4(a), FIG. 4(b), FIG. 4(c) and FIG. 4(d) show the micro structures and appearance of a fuel electrode support tube by the processing steps of the manufacturing method according to the present invention in scanning electron photographs.
Figure 4:
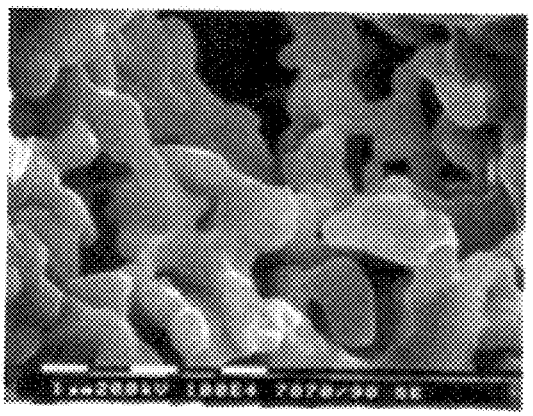
Figure 4:
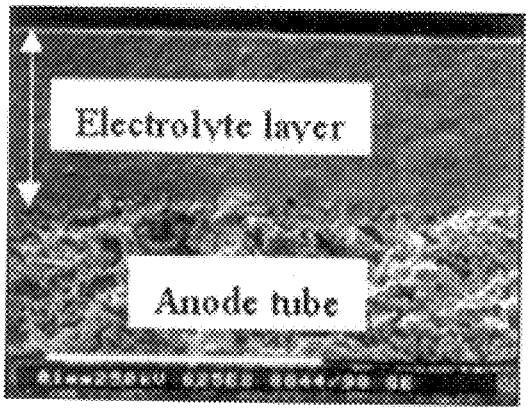
Figure 4:
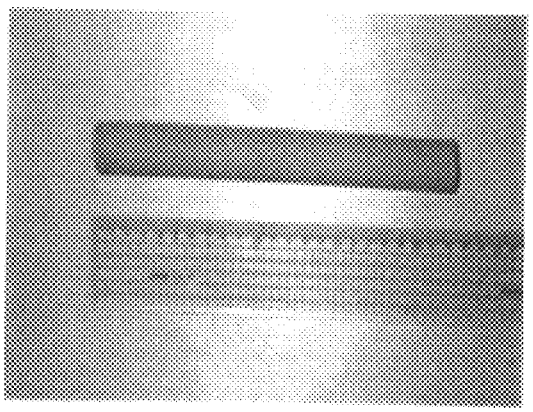

In FIG. 4, there are photographs showing the micro structures and appearance of a fuel electrode support tube by the processing steps of the manufacturing method according to the present invention (a) micro structure after the pre-sintering, (b) micro structure after the sintering, (c) micro structure of an electrolyte layer-coated fuel electrode support tube, and (d) an appearance of the fuel electrode support tube molded by extrusion.

The sintered fuel electrode support tube of FIG. 4b was measured to shrink at 22.7% and to have high mechanical strength. The pre-sintered fuel electrode support tube and the sintered fuel electrode support tube were measured as being 43% and 35% in porosity, respectively. The low porosity of the fuel electrode support tube after the sintering than immediately after the pre-sintering is considered to be attributed to the fact that the pore size distribution curve of the sintered fuel electrode support tube moves toward a greater side owing to the growth of pores and follows a bimodal behavior.

An examination was also made of the electrolyte layer coated on the fuel electrode support tube fabricated according to the method of the invention. The electrolyte layer coated on the pre-sintered fuel electrode tube was measured to be thin with a thickness of about 60 $\mu$m. Also, the electrolyte layer was observed as being well adhered to the surface of the fuel electrode support tube.

As a rule, gas permeation should be sufficiently high in the transverse direction across the fuel electrode support tube, but if gas permeation occurs across the electrolyte layer, direct chemical reactions occur between gases, causing cell performance to degrade significantly.

Figure 5:
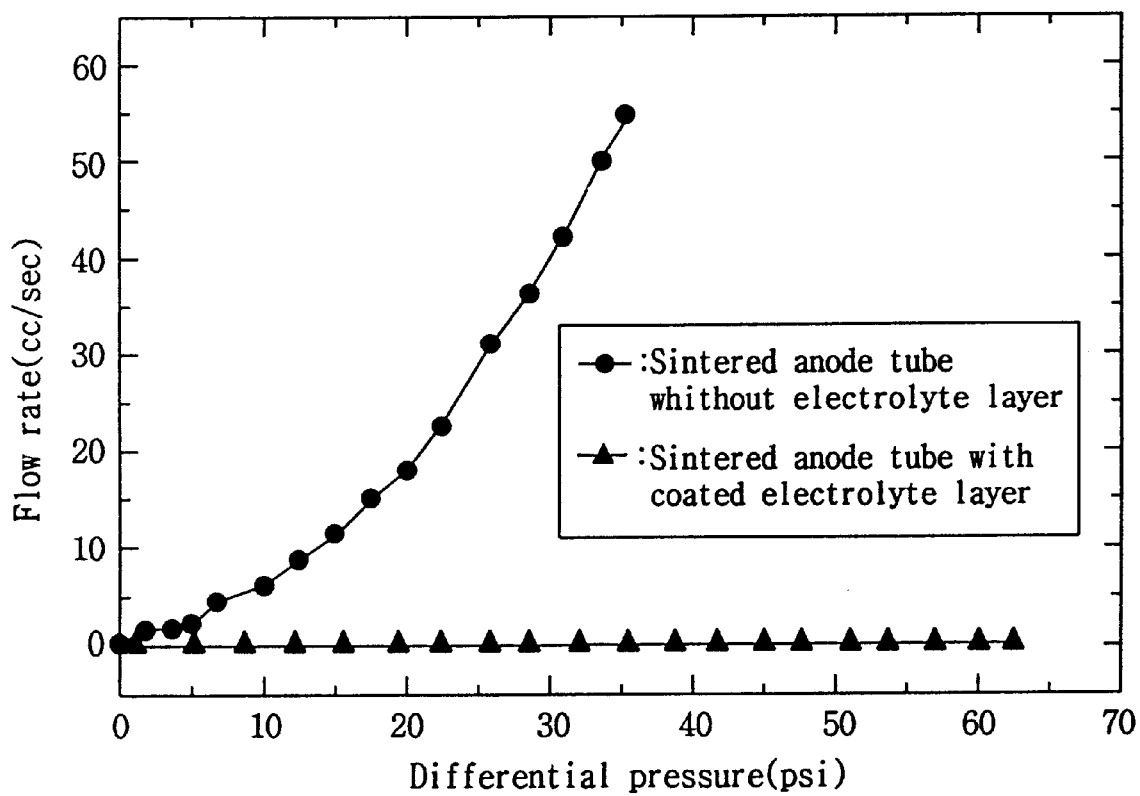
FIG. 5 is a graph in which the gas permeation rates of a fuel electrode support tube with and without electrolyte layer as a function of differential pressure.

With reference to FIG. 5, the gas permeability of the bare fuel electrode support tube was compared with that of the electrolyte layer-coated fuel electrode support tube after the co-sintering. As seen, the fuel electrode support tube itself is of high gas permeability whereas the electrolyte layer-coated fuel electrode support tube maintains low gas permeability not only at 1 atm, but also even at 4 atm, which demonstrates that the electrolyte layer is very dense. Consequently, the fuel electrode support tube itself is porous while the electrolyte layer plays a role as a barrier to gas permeation, so that they play their own full roles in ceramic fuel cells.

As described hereinbefore, the fuel electrode-supported tubular SOFC according to the present invention has a structure in which a fuel electrode made of a metal (Ni)/ceramic (YSZ) cermet which also plays a role as a support. An electrolyte layer underlaying an air electrode is coated as a thin film on the support in a slurry coating process, which is a low-cost process. The metal components (Ni) of the fuel electrode are connected to each other like a metal net improving the strength of the fuel electrode while the porous structure of the fuel electrode itself allows the sufficient permeation of fuel gas, thereby bringing about a significant economical profit in the production cost without degrading the performance of the fuel cell. Conventional air electrode-supported tubular SOFC employ air electrodes made of only a ceramic containing expensive La, which are brittle and become weakened by chemical reactions occurring on the ceramic structure. In addition, the conventional fuel cells are economically disadvantageous because an electrolyte layer is overlaid on the air electrode by an EVD process, which is a high-cost process.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for manufacturing a fuel electrode-supported tubular solid oxide fuel cell, comprising the steps:

mixing $Y_2O_3$-stabilized $ZrO_2$ powder containing 30 to 50 vol % of Ni with carbon powder which serves as a pore forming agent to give a fuel electrode slurry;

molding the fuel electrode slurry into a fuel electrode tube by extrusion;

pre-sintering the fuel electrode tube;

coating an electrolyte slurry made of $Y_2O_3$-stabilized $ZrO_2$ on the fuel electrode tube in a slurry coating process;

sintering the electrolyte-coated fuel electrode tube;

coating an air electrode slurry made of (La, Sr)$MnO_3$ powder on the co-sintered electrolyte fuel electrode tube in a slurry coating process; and sintering the air electrodeoated electrolyte fuel electrode tube.

2. A method as set forth in claim 1, wherein the carbon powder is used at an amount of 20 to 50 vol %.

3. A method as set forth in claim 1, wherein the pre-sintering step is carried out in the range 1,250–1,350° C.

4. A method as set forth in claim 1, wherein the electrolyte-coated fuel electrode tube is sintered in the range 1,400–1,500° C.

5. A method as set forth in claim 1, wherein the coated air electrode is sintered in the range 1,150–1,250° C.

* * * * *

UNITED STATES PATENT AND TRADEMARK OFFICE
CERTIFICATE OF CORRECTION

PATENT NO.   : 6,436,565 B1
DATED        : August 20, 2002
INVENTOR(S)  : Song et al.

It is certified that error appears in the above-identified patent and that said Letters Patent is hereby corrected as shown below:

<u>Title page,</u>
Item [73], Assignee, delete "Seoul (KR)" and substitute therefor -- Taejon (KR) --.

<u>Column 3,</u>
Line 29, delete "racks" and substitute therefor -- cracks --.
Lines 49-50, delete "presin-tering" and substitute therefore -- pre-sintering --.

<u>Column 6,</u>
Line 27, delete "col" and substitute therefor -- vol --.

<u>Column 8,</u>
Line 34, delete "electrodeoated" and substitute therefore -- electrode-coated --.

Signed and Sealed this

Tenth Day of December, 2002

JAMES E. ROGAN
*Director of the United States Patent and Trademark Office*